ized filename US010807513B2

(12) United States Patent
Paterno

(10) Patent No.: US 10,807,513 B2
(45) Date of Patent: Oct. 20, 2020

(54) MICROPROCESSOR CONTROLLED RECHARGEABLE BRAKE LIGHT CONTROL CIRCUIT

(71) Applicant: Alpine 4 Technologies, Ltd, Phoenix, AZ (US)

(72) Inventor: Greg Paterno, Scottsdale, AZ (US)

(*) Notice: Subject to any disclaimer, the term of this patent is extended or adjusted under 35 U.S.C. 154(b) by 437 days.

(21) Appl. No.: 15/783,811

(22) Filed: Oct. 13, 2017

(65) Prior Publication Data

US 2018/0105096 A1 Apr. 19, 2018

Related U.S. Application Data

(60) Provisional application No. 62/408,749, filed on Oct. 15, 2016.

(51) Int. Cl.
*B60Q 1/00* (2006.01)
*B60R 16/033* (2006.01)
*B60Q 1/44* (2006.01)
*B60Q 1/46* (2006.01)
*H05B 47/105* (2020.01)

(52) U.S. Cl.
CPC .............. *B60Q 1/0094* (2013.01); *B60Q 1/44* (2013.01); *B60Q 1/441* (2013.01); *B60Q 1/46* (2013.01); *B60R 16/033* (2013.01); *H05B 47/105* (2020.01)

(58) Field of Classification Search
CPC .......... B60Q 1/0094; B60Q 1/46; B60Q 1/44; B60Q 1/441; H05B 47/105; B60R 16/033
See application file for complete search history.

(56) References Cited

U.S. PATENT DOCUMENTS

| 5,345,218 | A | 9/1994 | Woods et al. |
| 6,414,437 | B1 | 7/2002 | Diez et al. |
| 9,238,432 | B1* | 1/2016 | Jameson .................. B60Q 1/46 |
| 9,643,534 | B1* | 5/2017 | Zharichenko .......... B60Q 1/447 |
| 2015/0360603 | A1* | 12/2015 | Miner .................... B60Q 1/302 340/479 |
| 2018/0022272 | A1* | 1/2018 | Paterno .................... B60Q 1/44 340/479 |

\* cited by examiner

*Primary Examiner* — Jared Fureman
*Assistant Examiner* — Emmanuel Dominique
(74) *Attorney, Agent, or Firm* — Keith L. Jenkins, Registered Patent Attorney LLC; Keith L. Jenkins

(57) ABSTRACT

A microprocessor-controlled rechargeable brake light control circuit is a compact package with connectors that includes a rechargeable power source, a power supply sensor, and a non-volatile memory connected to a microprocessor. When power is abruptly disconnected, as when the brake is disengaged, there still is enough power to the device from the rechargeable power source for a period of time that allows a microprocessor to store an indication, such as a time stamp, of approximately where in time the pulse sequence terminated. When the brake is again depressed and power is restored to the circuit, that time stamp may be used as a reference point to restart the pulse sequence. Pulsing of the brake light is through a MOSFET switch pulse circuit that receives vehicle power when the brake pedal is depressed and imprints a pulse pattern on that vehicle power responsive to pulse sequence command from the microprocessor.

20 Claims, 3 Drawing Sheets

MICROPROCESSOR CONTROLLED RECHARGEABLE BRAKE LIGHT CONTROL CIRCUIT

RELATIONSHIP TO OTHER APPLICATIONS

This application claims the benefit of U.S. Provisional Patent Application Ser. No. 62/408,749 filed Oct. 15, 2016 to the same inventor.

FIELD OF ART

The present invention relates to a method and system for controlling the pulse sequence of a brake light, i.e. a center high mounted stop lamp (CHMSL), while preventing the light from flashing in an undesirable way, i.e. resembling emergency vehicle. The present invention more particularly relates to a CHMSL pulser that has rechargeable power for a microprocessor.

BACKGROUND OF THE INVENTION

As aftermarket rear end collision avoidance systems become more popular, certain states have passed or considered passing laws that regulate how these systems perform. All competitors manufacturing aftermarket rear end collision avoidance systems use the activation of the vehicles brakes as not only the power supply for the electronics of their device, but also the initiation of any logic or program that is controlling their device. Consequently, when the brake is released, the power is immediately disconnected, leaving no way of knowing what pulses mayor may not have been performed, and should stop and go traffic cause the operator to "pump" the brakes, then the operator may be implementing their own pulse sequence that not only is different from the intended sequence, may possibly resemble an emergency vehicle or resemble a behavior of pulses that is illegal in some jurisdictions.

Presently, installing aftermarket brake light pulsing devices is popular amongst car dealerships wishing to increase profits while giving customers a real and tangible benefit of having the dealership install an aftermarket device. The dealerships install this device in new and used vehicles either in advance or at the time of purchase, and the consumer agrees to pay for this installation under the premise of increased safety or insurance rebates. In some states, laws or restrictions have been passed to regulate the behavior of brake lights to ensure CHMSL is consistent with its intended function and/or doesn't exhibit any behavior considered undesirable. One of the behaviors that is considered undesirable is any behavior resembling the light pulsing of an emergency vehicle. This is typically defined as a pulse string that continues for longer than five seconds. Although most related products are designed not to exhibit such behavior, all these products also lose power abruptly when the brake is released causing the device to reset when the operator next engages the brake. This allows for the inevitable circumstance that the operator may "pump" the brake or engage and disengage the brake in a manner that results in a continuous pulse string lasting more than five seconds or may exhibit any number of undesirable pulse patterns. One competitive device employs a "lockout delay" to make this scenario unlikely but there is no known device that can ensure prevention of any known bad behavior.

SUMMARY OF THE INVENTION

The present invention implements a rechargeable power source, such as a double layered capacitor or battery, as well as non-volatile memory such as an electrically erasable programmable read-only memory (EEPROM) as part of its circuitry. This ensures that when power is abruptly disconnected, as when the brake is disengaged, there still is enough power to the device for a period of time that allows a microprocessor to store an indication, such as a time stamp, of approximately where in time the pulse sequence terminated. When the brake is again depressed and power is restored to the circuit, that time stamp is used as a reference point to restart the pulse sequence. In addition, any other data or information such as prior operator behavior or any information in the future that may be useful in determining future behavior, including but not limited to, making sure the light functions as intended.

An embodiment of the present invention employs a circuit designed to pulse a vehicle's brake light when the brake pedal is depressed and the present invention is installed into an original equipment manufacturer (OEM) brake light system. The circuit contains an electrical energy storage component such as, without limitation, a capacitor or battery that collects a charge when the circuit has power so that when power is disconnected, the critical components can continue to function and perform operations that otherwise would be impossible when the brake system disengages. The circuit of the present invention contains a microprocessor that is programmed with firmware that controls the pulse and the pulse sequence, and is connected to the electrical energy storage component. The circuit of the present invention also contains an EEPROM or other similarly functional type of non-volatile memory. The circuit of the present invention contains a "Power Sense" input to the microprocessor allowing the processor to immediately determine when the brake is disengaged or when it is engaged again. The microprocessor firmware contains a routine that includes the complete, desired pulse sequence to be implemented when brake is engaged. The microprocessor firmware contains a routine that stores the position or place within the pulse sequence routine immediately upon determining that the brake has been disengaged, effectively acting as a temporary "pause", allowing for continuation or "play" again should the brake be engaged again within a predetermined period of time. The microprocessor firmware can be updated, modified or reprogrammed at any time.

An embodiment includes a microprocessor-controlled rechargeable brake light control circuit including: a rechargeable electrical energy storage component connected to a power supply; a reprogrammable microprocessor is: connected to receive power from either the electrical energy storage component or the power supply; programmed to supply a pulse sequence of switching commands to a MOSFET switch pulse circuit; and programmed to supply one or more time stamps to a non-volatile memory; and an isolated power sensor connected to sense power from the power supply and connected to the microprocessor to indicate power status. That circuit, including the non-volatile memory: in communication with the microprocessor; and adapted to store the one or more time stamps related to the pulse sequence. That circuit, where the pulse sequence is one of a plurality of stored selectable pulse sequences. That circuit, where the power supply is connectable to receive vehicle power through a brake pedal switch when such brake pedal is depressed. That circuit, where the MOSFET switch pulse circuit is connectable to receive vehicle power through the brake pedal switch when the brake pedal is depressed. That circuit, where the isolated power sensor is electronically isolated from the electrical energy storage component. That circuit, including a serial communications port connected to and in communication with the microprocessor. That circuit, where the at least one time step is saved at least one of: upon interruption of power from the power supply; and upon crossing any time stamp during the pulse sequence. That circuit, where an interrupted pulse sequence is restarted, after power restoration, by the microprocessor at the most recently saved time stamp of the at least one saved time stamps.

An embodiment includes a microprocessor-controlled rechargeable brake light control circuit including: a rechargeable electrical energy storage component connected to a power supply; a reprogrammable microprocessor is: connected to receive power from either the electrical energy storage component or the power supply; programmed to supply a pulse sequence of switching commands to a MOSFET switch pulse circuit; and programmed to supply at least one time stamp to a non-volatile memory; an isolated power sensor connected to sense power from the power supply and connected to the microprocessor to indicate power status; and the non-volatile memory: in communication with the microprocessor; and adapted to store the one or more time stamps related to the pulse sequence. That circuit, including a serial communications port connected to, and in communication with, the microprocessor. That circuit, where a time step is saved at least one of: upon interruption of power from the power supply; upon crossing any time stamp during the pulse sequence; and where an interrupted pulse sequence is restarted by the microprocessor, after power restoration, at the most recently saved time stamp of the saved time stamps. That circuit, where: the power supply is connectable to receive vehicle power through a brake pedal switch when such brake pedal is depressed; and the MOSFET switch pulse circuit is connectable to receive vehicle power through the brake pedal switch when the brake pedal is depressed. That circuit, where the pulse sequence is one of a plurality of stored selectable pulse sequences. That circuit, where the isolated power sensor is electronically isolated from the electrical energy storage component.

An embodiment includes a microprocessor-controlled rechargeable brake light control circuit including: a rechargeable electrical energy storage component connected to a power supply; a reprogrammable microprocessor: connected to receive power from either the electrical energy storage component or the power supply; programmed to supply a pulse sequence of switching commands to a MOSFET switch pulse circuit; and programmed to supply at least one time stamp to a non-volatile memory; an isolated power sensor connected to sense power from the power supply and connected to the microprocessor to indicate power status; the non-volatile memory: in communication with the microprocessor; and adapted to store the at least one time stamp related to the pulse sequence; and a serial communications port connected to and in communication with the microprocessor. That circuit, where a time step is saved at least one of: upon interruption of power from the power supply; upon crossing any time stamp during the pulse sequence; and where an interrupted pulse sequence is restarted, after power restoration, by the microprocessor at the most recently saved time stamp of the saved time stamps. That circuit, where the pulse sequence is one of a plurality of stored selectable pulse sequences. That circuit, where: the power supply is connectable to receive vehicle power through a brake pedal switch when such brake pedal is depressed; and the MOSFET switch pulse circuit is connectable to receive vehicle power through the brake pedal switch when the brake pedal is depressed. That circuit, where the isolated power sensor is electronically isolated from the electrical energy storage component.

DESCRIPTION OF THE FIGURES OF THE DRAWINGS

The present invention will hereinafter be described in conjunction with the following drawing figures, wherein like numerals denote like elements.

DETAILED DESCRIPTION OF THE INVENTION

Figure 1:
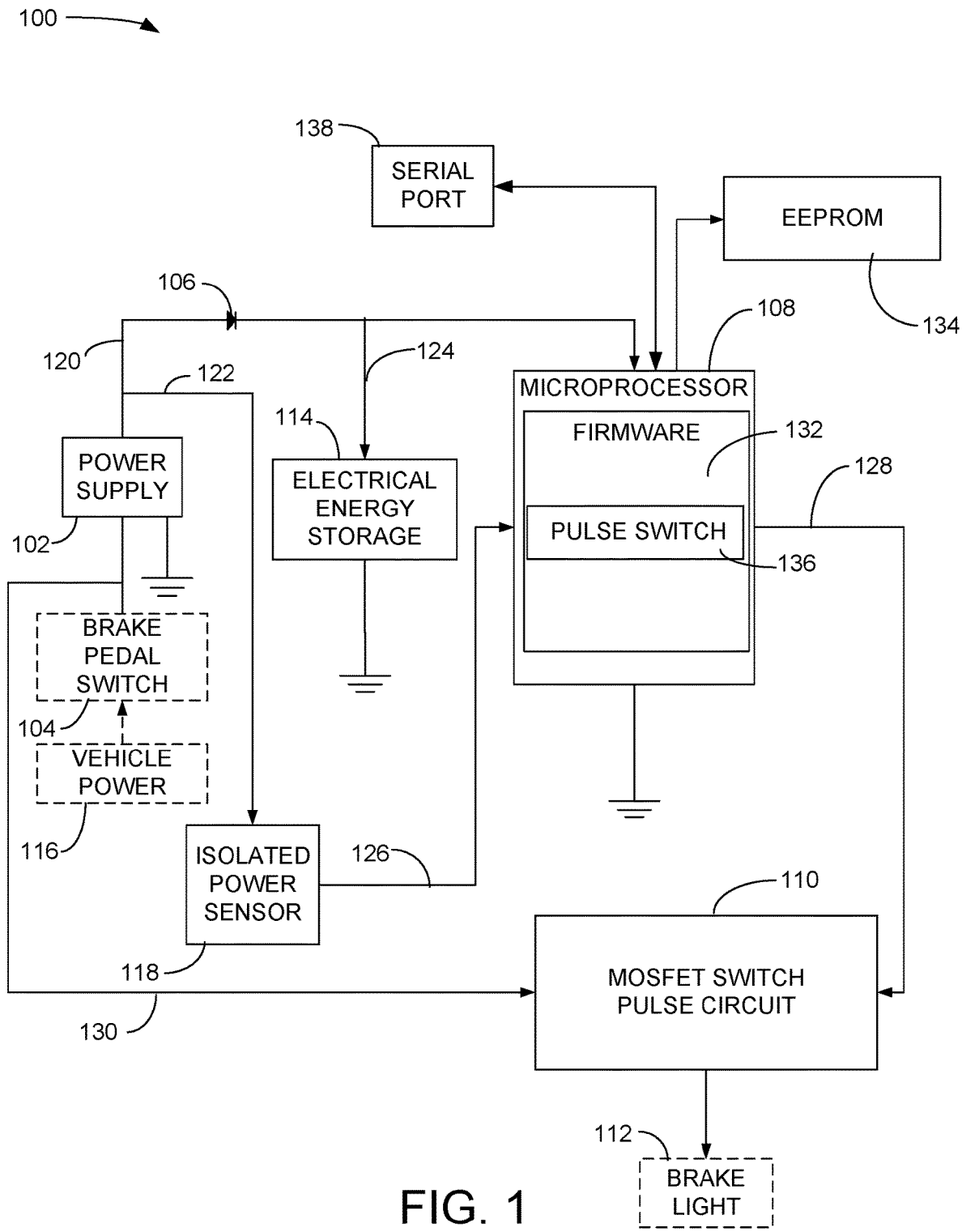
FIG. 1 is a diagrammatic view illustrating an exemplary embodiment of a rechargeable microprocessor controlled brake light control circuit, according to a preferred embodiment of the present invention.

FIG. 1 is a diagrammatic view illustrating an exemplary embodiment of a rechargeable microprocessor controlled brake light control circuit 100, according to a preferred embodiment of the present invention. Power supply 102 is a low-voltage (five volt) power supply for supplying electronic components. Power supply 102 is supplied with electrical power from vehicle power 116 when brake pedal switch 104 is depressed. When brake pedal switch 104 is depressed, electrical power flows from the power supply 102 on electrical conductor 120 to power the microprocessor 108 and to recharge electrical energy storage 114, and along electrical conductor 122 to provide power to the isolated power sensor 118. When brake pedal switch 104 is released, power stops flowing from the power supply 102 to the isolated power sensor 118, to the microprocessor 108, and to the MOSFET switch pulse circuit 110, causing brake light 112 to turn off. Microprocessor 108 is preferably a flash-based microprocessor 108 operating at four million instructions per second. Microprocessor 108 can be programmed and reprogrammed with firmware 132 and also provides non-volatile data storage 134, via, for non-limiting example, an EEPROM 134, and a microelectronic pulse switch 136. Microelectronic pulse switch 136 forms the pulse sequence commands for the microprocessor 108 to send to the MOSFET switch pulse circuit 110. Microprocessor 108 is equipped with serial communications 138 and can communicate with all peripheral smart devices in the circuit as well as most peripherals that may comprise future revisions. When power is applied along electrical conductor 120, microprocessor 108 initiates and sustains a pulse sequence control output 128 to a MOSFET switch pulse circuit 110 that turns on during pulse sequence commands to conduct electrical vehicle power 116 along electrical conductor 130, through MOSFET switch circuit 110, to brake light 112.

Existing OEM brake light systems provide power when the brake is engaged and cut power immediately when the brake is disengaged, leaving microprocessor 108 without power. To avoid such a microprocessor 108 shut down, electrical energy storage 114 is wired into electrical conductor 120 to receive and store electrical energy when the brake pedal switch 104 is depressed, and to supply electrical energy to microprocessor 108 when brake pedal switch 108 is released. Electrical energy storage 114 is preferably capable of rapid charging while power is supplied and can discharge to keep the microprocessor 108 operating for an adequate amount of time to store any data needed and to perform any routine necessary once the brake pedal switch 104 is released or power is interrupted. Preferably, electrical energy storage 114 is a double-layered capacitor. In various embodiments, electrical energy storage 114 may be a capacitor, super capacitor, ultra capacitor, battery, or similarly functional device. Diode 106 prevents electrical energy storage 114 from discharging anywhere except into the microprocessor 108, and isolates the isolated power sensor from the electrical energy storage 114.

Electrical conductor 122 provides electrical power to the isolated power sensor 118. Output from isolated power sensor 118 goes along power sensor output line 126, which is a low power input to microprocessor 108. Power sensor output line 126 provides microprocessor 108 with information regarding power status, enabling microprocessor 108 to take appropriate actions in response. When brake pedal switch 104 is depressed, the power sensor output line 126 carries three to five volts DC. When brake pedal switch 104 is released, the power sensor output line 126 carries zero volts DC. Adaptive to the speed of the microprocessor 108, the isolated power sensor 118 is configured to provide a very high speed for state transitions.

Figure 2:
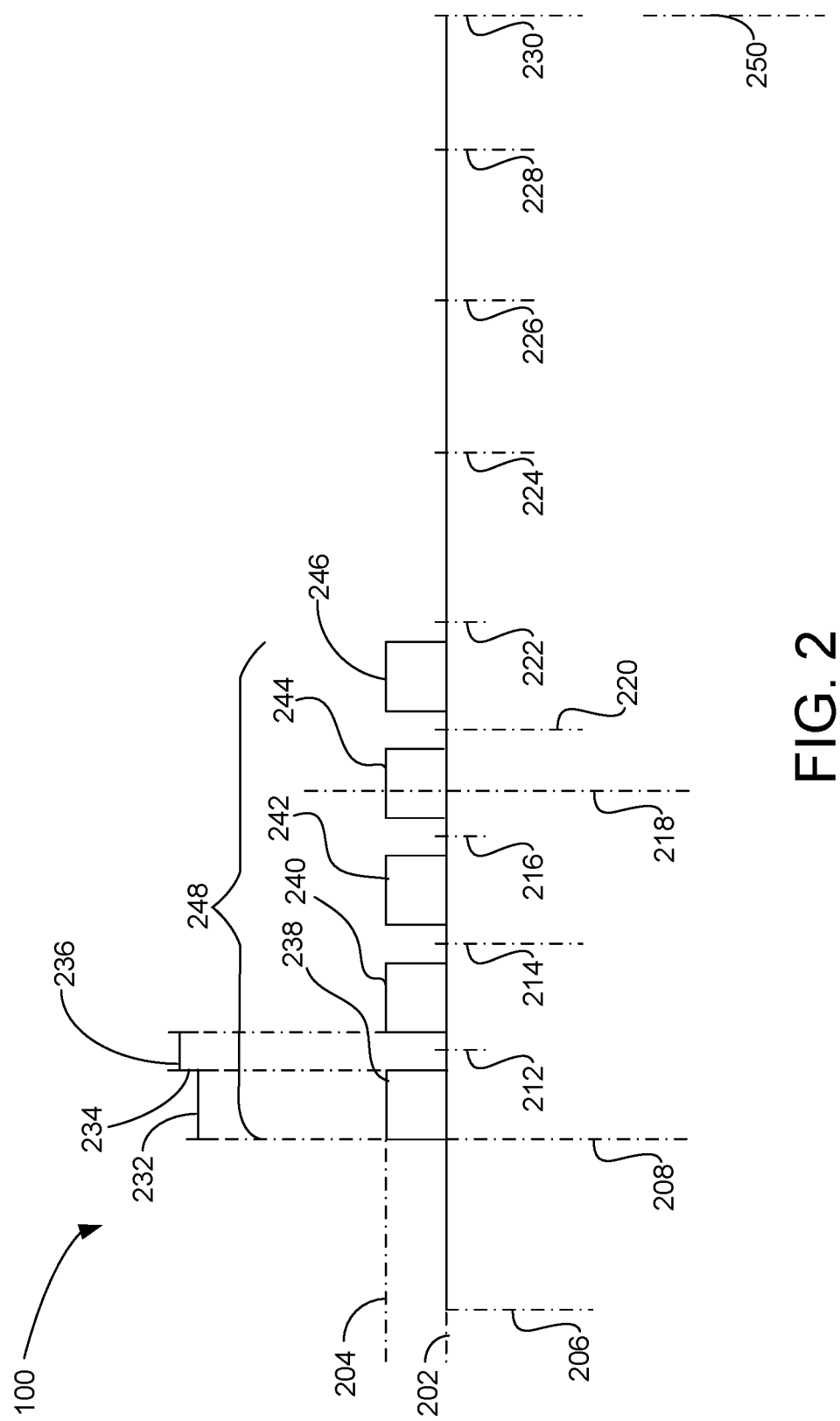
FIG. 2 is a timing diagram illustrating the exemplary embodiment of the rechargeable microprocessor controlled brake light control circuit of FIG. 1, according to a preferred embodiment of the present invention.

FIG. 2 is a timing diagram illustrating the exemplary embodiment of the rechargeable microprocessor controlled brake light control circuit 100 of FIG. 1, according to a preferred embodiment of the present invention. Firmware 132 within the microprocessor 108 preferably contains a pulse sequence 248 that includes pulses 238, 240, 242, 244, and 246 and time-stamps 212, 214, 216, 220, 222, 224, 226, 228, and 230. The brake pedal switch 104 is shown depressed from initiation 208 to final release at 250, with momentary release at 218. The pulse routine 248 contains highs 204 and lows 202 corresponding to the activation and deactivation of a microelectronic pulse switch 136 within microprocessor 108. In turn, the microelectronic pulse switch 136 activates MOSFET switch 110 that dims 232 or lessens the intensity of the light output of brake light 112 when 208 the firmware 132 outputs a high 204 and then returns the light to full brightness 236 when 234 firmware 132 outputs a low 202. The pulse sequence 248 shown here is merely exemplary and is one of millions of possible pulse sequences. The present invention 100 pertains to a process that is implemented when the brake pedal switch 104 is released and to a configuration for supplying power after an abrupt power loss to the microprocessor 108. This example assumes that memory in EEPROM 134 points to a sequence initialization 208 and that no mid-sequence time stamps 212, 214, 216, 220, 222, 224, 226, 228, and 230 are stored in EEPROM 134. With the brake pedal switch 104 being applied the firmware 132 initiates 208 a pulse sequence 248. As depression of the brake pedal switch 104 continues and the pulse sequence 248 is generating, the rechargeable electrical energy storage component 114, which is designed to charge rapidly, begins to charge and in fractions of a second is fully charged. The firmware 132 will continue to generate while recording each time it passes a time stamp 212, 214, 216, 220, 222, 224, 226, 228, and 230, effectively recording its approximate position in time. The microprocessor 108 is also monitoring the power sense input 126 to check for the release of the brake pedal switch 104. When the brake pedal switch 104 is released at 218, the microprocessor 108 is powered temporarily by the rechargeable electrical energy storage component 114 and, having immediately sensed the abrupt loss of main power to the brake light 112, records the most recently stored time stamp 216 to the EEPROM 134. The processor 108 keeps the pulse sequence 248 paused at 218. When the brake pedal switch 104 is depressed again, the pulse sequence 248 begins to generate again almost exactly where it left off 218. If the rechargeable component 114 runs out of power before the brake pedal switch 104 is pressed again, the EEPROM 134 already holds the data to indicate the previous point 218 in the pulse sequence 248 and determine at what point 218 to proceed if the pulse sequence 248 is starting from a reset condition. In a particular embodiment, time stamps may be generated and saved at rates higher than those illustrated, to improve the accuracy of the last-stored time stamp 216.

Figure 3:
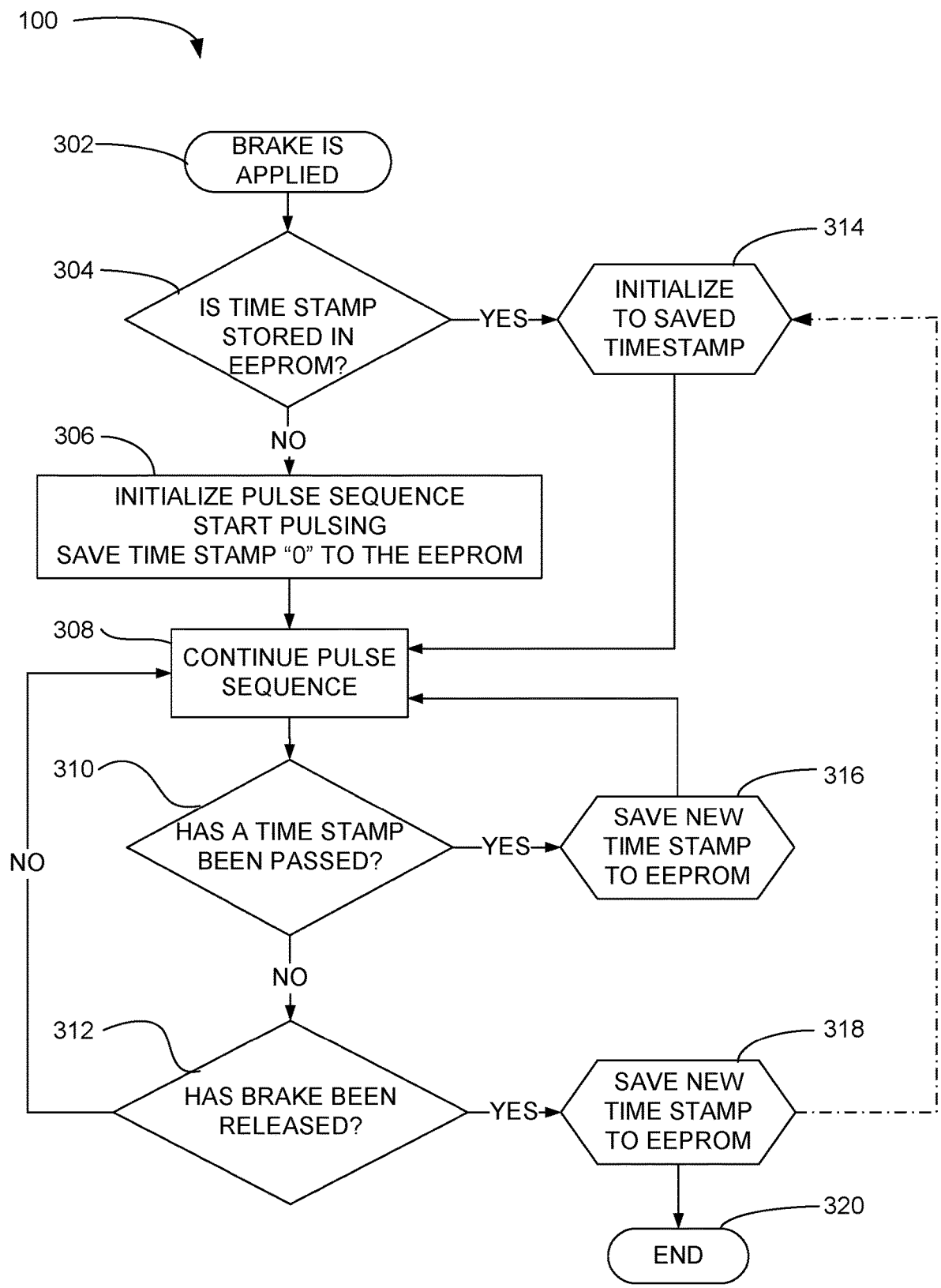
FIG. 3 is a flowchart illustrating the exemplary embodiment of the rechargeable microprocessor controlled brake light control circuit of FIG. 1, according to a preferred embodiment of the present invention.

FIG. 3 is a flowchart illustrating the exemplary embodiment of the rechargeable microprocessor controlled brake light control circuit 100 of FIG. 1, according to a preferred embodiment of the present invention. In step 302, a vehicle operator applies the brakes, depressing the associated brake pedal switch 104. In step 304, a decision is made in firmware 132 as to whether or not a time stamp is stored in EEPROM 134 by checking a register flag. If so, the pulse sequence is initialized 314 to the saved time stamp 212, 214, 216, 220, 222, 224, 226, 228 or 230, and the pulse sequence 248 continues 308. Step 314 enables maintaining the pulse sequence 248 when the brake pedal switch 104 is rapidly turned on and off by the operator. The time stamp 212, 214, 216, 220, 222, 224, 226, 228 or 230 used to initialize the pulse sequence 248 was saved by a previous step 318. If not 306, a pulse sequence 248 is initialized and generated, and a time stamp of zero is saved in EEPROM 134. As the pulse sequence 248 continues 308, a test 310 is periodically performed to determine if a time stamp, such as 212, has been passed. If so, the time stamp just passed 212 is stored 316 in the EEPROM 134 and the pulse sequence 248 continues 308. If not, a test 312 is performed to determine if the brake pedal switch 104 has been released. If so, the latest time stamp 212, 214, 216, 220, 222, 224, 226, 228, 230 or the initial zero, is stored 318 in EEPROM 134, and the pulse sequence 248 ends 320. If not, the pulse sequence 248 continues 308.

Recording the previous time stamps 212, 214, 216, 220, 222, 224, 226, 228 or 230 allows for control of pulse sequences 248 regardless of how rapidly the brake pedal switch 104 is engaged and disengaged, and so neither the brake pedal switch 104 operator nor any other outside factor can change the desired pulse sequence 248.

Although the microprocessor 108 might be programmed for many cycles of pulsing, in between each cycle the firmware 132 checks for a request for communication on the serial port 138. Preferably, the serial port 138 includes a wireless transceiver, such as radio, Bluetooth®, or similarly effective means. If communication is requested, the normal pulse sequence 248 is abandoned and a communications sub-routine is begun within firmware 132 to receive either a software update or software modification routine. Saved values can also be communicated for use by engineers or technicians.

I claim:

1. A microprocessor-controlled rechargeable brake light control circuit comprising:
   a. a rechargeable electrical energy storage component connected to a power supply;
   b. a reprogrammable microprocessor:
      i. connected to receive power from either said electrical energy storage component or said power supply;

ii. programmed to supply a pulse sequence of switching commands to a MOSFET switch pulse circuit; and
iii. programmed to supply at least one time stamp to a non-volatile memory; and
c. an isolated power sensor connected to sense power from said power supply and connected to said microprocessor to indicate power status.

2. The circuit of claim 1, comprising said non-volatile memory:
a. in communication with said microprocessor; and
b. adapted to store said at least one time stamp related to said pulse sequence.

3. The circuit of claim 1, wherein said pulse sequence is one of a plurality of stored selectable pulse sequences.

4. The circuit of claim 1, wherein said power supply is connectable to receive vehicle power through a brake pedal switch when such brake pedal is depressed.

5. The circuit of claim 1, wherein said MOSFET switch pulse circuit is connectable to receive vehicle power through said brake pedal switch when said brake pedal is depressed.

6. The circuit of claim 1, wherein said isolated power sensor is electronically isolated from said electrical energy storage component.

7. The circuit of claim 1, comprising a serial communications port permanently connected to said microprocessor and connectable to be in communication with a data source external to said microprocessor-controlled rechargeable brake light control circuit.

8. The circuit of claim 1, wherein said at least one time step is saved at least one of:
a. upon interruption of power from said power supply; and
b. upon crossing any time stamp during said pulse sequence.

9. The circuit of claim 2, wherein an interrupted pulse sequence is restarted, after power restoration, by said microprocessor at the most recently saved time stamp of said at least one saved time stamps.

10. A microprocessor-controlled rechargeable brake light control circuit comprising:
a. a rechargeable electrical energy storage component connected to a power supply;
b. a reprogrammable microprocessor:
i. connected to receive power from either said electrical energy storage component or said power supply;
ii. programmed to supply a pulse sequence of switching commands to a MOSFET switch pulse circuit; and
iii. programmed to supply at least one time stamp to a non-volatile memory;
c. an isolated power sensor connected to sense power from said power supply and connected to said microprocessor to indicate power status; and
d. said non-volatile memory:
i. in communication with said microprocessor; and
ii. adapted to store said at least one time stamp related to said pulse sequence.

11. The circuit of claim 10, comprising a serial communications port connected to and in communication with said microprocessor.

12. The circuit of claim 10, wherein said at least one time step is saved at least one of:
a. upon interruption of power from said power supply;
b. upon crossing any time stamp during said pulse sequence; and
c. wherein an interrupted pulse sequence is restarted, after power restoration, by said microprocessor at the most recently saved time stamp of said at least one saved time stamps.

13. The circuit of claim 10, wherein:
a. said power supply is connectable to receive vehicle power through a brake pedal switch when such brake pedal is depressed; and
b. said MOSFET switch pulse circuit is connectable to receive vehicle power through said brake pedal switch when said brake pedal is depressed.

14. The circuit of claim 10, wherein said pulse sequence comprises one of a plurality of stored selectable pulse sequences.

15. The circuit of claim 1, wherein said isolated power sensor is electronically isolated from said electrical energy storage component.

16. A microprocessor-controlled rechargeable brake light control circuit comprising:
a. a rechargeable electrical energy storage component connected to a power supply;
b. a reprogrammable microprocessor:
i. connected to receive power from either said electrical energy storage component or said power supply;
ii. programmed to supply a pulse sequence of switching commands to a MOSFET switch pulse circuit; and
iii. programmed to supply at least one time stamp to a non-volatile memory;
c. an isolated power sensor connected to sense power from said power supply and connected to said microprocessor to indicate power status;
d. said non-volatile memory:
i. in communication with said microprocessor; and
ii. adapted to store said at least one time stamp related to said pulse sequence; and
e. a serial communications port permanently connected to said microprocessor and connectable to be in communication with a data source external to said microprocessor-controlled rechargeable brake light control circuit.

17. The circuit of claim 16, wherein said at least one time step stamp is saved at least one of:
a. upon interruption of power from said power supply;
b. upon crossing any time stamp during said pulse sequence; and
c. wherein an interrupted pulse sequence is restarted, after power restoration, by said microprocessor at the most recently saved time stamp of said at least one saved time stamps.

18. The circuit of claim 16, wherein said pulse sequence is one of a plurality of stored selectable pulse sequences.

19. The circuit of claim 16, wherein:
a. said power supply is connectable to receive vehicle power through a brake pedal switch when such brake pedal is depressed; and
b. said MOSFET switch pulse circuit is connectable to receive vehicle power through said brake pedal switch when said brake pedal is depressed.

20. The circuit of claim 16, wherein said isolated power sensor is electronically isolated from said electrical energy storage component.

* * * * *